United States Patent [19]
Pennington et al.

[11] 3,868,192
[45] Feb. 25, 1975

[54] METHOD AND MEANS FOR ASSEMBLING PISTON AND PISTON ROD

[75] Inventors: Harold W. Pennington, Battle Creek; William H. Ward, Athens, both of Mich.

[73] Assignee: Clark Equipment Company, Buchanan, Mich.

[22] Filed: Oct. 5, 1972

[21] Appl. No.: 295,399

[52] U.S. Cl. .................. 403/263, 403/281, 92/172
[51] Int. Cl. .............................................. F16d 1/06
[58] Field of Search .......... 403/280, 281, 374, 257, 403/242, 274, 261, 279, 263; 285/331, 382; 92/172; 29/156.5 R, 156.5 A, 520

[56] References Cited
UNITED STATES PATENTS

| | | | |
|---|---|---|---|
| 1,091,106 | 3/1914 | Adams | 403/274 X |
| 2,216,353 | 10/1940 | Park | 403/345 UX |
| 2,281,973 | 5/1942 | Healy | 285/382 X |
| 2,361,244 | 10/1944 | Smith | 403/355 |
| 2,998,288 | 8/1961 | Newhouse | 403/345 UX |
| 3,560,124 | 2/1971 | Bergere | 85/7 |

FOREIGN PATENTS OR APPLICATIONS

| | | | |
|---|---|---|---|
| 55,836 | 10/1912 | Austria | 29/517 |
| 970,963 | 11/1958 | Germany | 29/520 |

*Primary Examiner*—Andrew V. Kundrat
*Attorney, Agent, or Firm*—John C. Weissler

[57] ABSTRACT

Means for securing a piston head to a piston rod by swaging a flange formed on the piston head into a circumferential tapered groove formed in the piston rod by means of a swaging tool which is incorporated in and becomes an integral part of the piston head.

7 Claims, 5 Drawing Figures

PATENTED FEB 25 1975  3,868,192
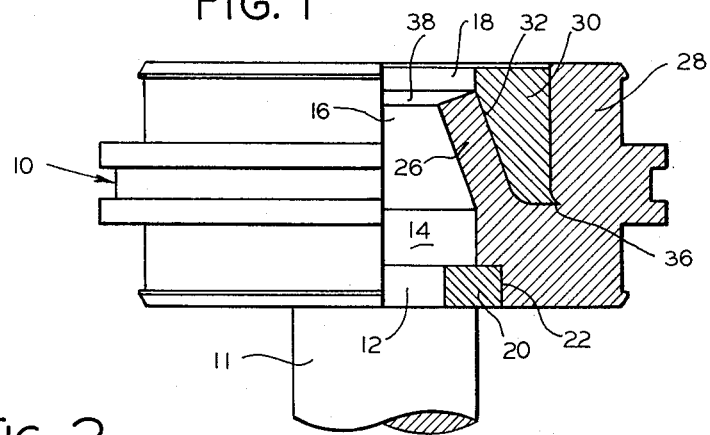
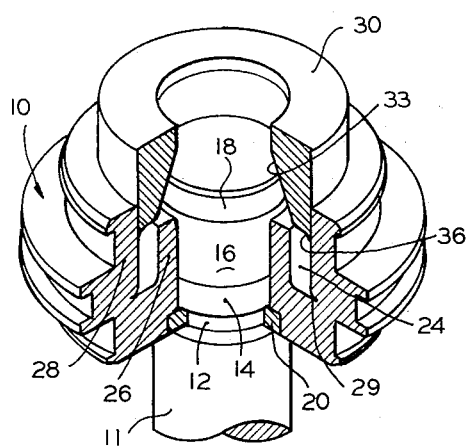
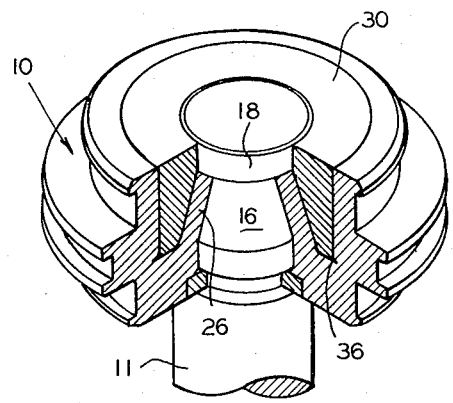
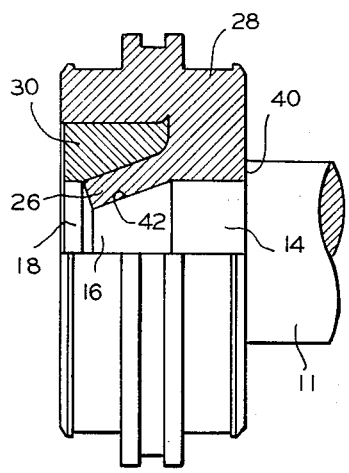
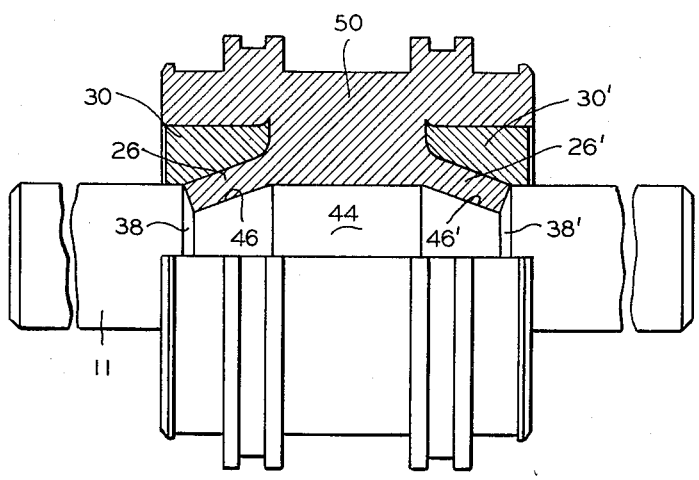

METHOD AND MEANS FOR ASSEMBLING PISTON AND PISTON ROD

BACKGROUND OF THE INVENTION

The field of art to which the invention pertains includes pistons and means of securing a piston head to a piston rod.

Heretofore it has been common practice to secure piston heads to piston rods by various means such as brazing, welding, threadedly connecting the one element to the other, utilizing bolted connections, snap rings holding a piston head in position on the shoulder of a piston rod, or even press fitting the elements. In addition, cold forming methods have been used by swaging a cantilevered flange of a piston head or collar into a circumferential groove of a shaft, as disclosed in U.S. Patent Nos. 1,721,765 and 2,361,244. There has been a need for improving the means of securing such elements together.

BRIEF DESCRIPTION OF THE DRAWING

FIG. 1 is a broken-away partial sectional view showing a piston head mounted on a piston rod in accordance with my invention;

FIG. 2 is a perspective partial cut-away view showing the structure of FIG. 1 preparatory to swaging of the piston head on the piston rod by a swaging ring;

FIG. 3 is another view as in FIG. 2, but showing the piston head securely engaged on the piston rod as in FIG. 1;

FIG. 4 is a view similar to FIG. 1 of a slightly modified version of the invention; and FIG. 5 is a broken-away partial sectional view of a modification showing a piston rod having a center mounted double-sided piston head.

DESCRIPTION OF THE PREFERRED EMBODIMENT

Referring now to FIGS. 1–3, a piston head 10 is adapted to be located at the end of a piston rod 11 in which is provided a circumferential groove 12, axially outwardly of which the rod extends a short distance at full diameter and then extends inwardly to form a tapered circumferential surface portion 16 which in turn forms a complementary tapered groove in the piston rod. An enlarged rod end 18 preferably has a diameter substantially the same as the diameter of the piston rod. A split ring 20 may be formed of two semi-circular ring sectors for registry with groove 12 in order to provide an abutting surface for an inner circumferential stepped portion 22 of the piston head which complements the one corner portion of ring 20 upon assembly as shown. An internal annular groove 24 is formed in the piston head between an inner axially extending swageable flange 26 and an outer axially extending flange 28. When the piston head is assembled in abutting position with ring 20, before swaging, inner flange 26 overhangs the tapered groove in the piston rod formed by the tapered surface 16. A locking tip groove 29 is formed at an outer circumferential corner portion of annular groove 24 for a purpose to be described.

A tapered swage ring 30 of the configuration shown functions both as a swaging tool and as an integral part of the piston head following the swaging operation. It has a configuration which includes a tapered circumferential tooling surface 32 which, when coaxially disposed with the piston rod as shown is parallel to tapered rod surface 16. It includes a tip end 36 which is adapted to register with locking groove 29 at the terminal portion of the swaging operation in order to lock the swage ring rigidly into the piston head, as shown, for example, in FIGS. 1 and 3. The "before" and "after" steps in the swaging operation are illustrated in FIGS. 2 and 3, following which the piston assembly is ready for service with swaging ring member 30 having become a permanent and integral part of the piston head.

The swaging operation may be carried out, for example, by mounting the piston rod in a machine press, the working end of which is adapted to engage the swage ring 30 and press the ring into the internal groove 24, as shown, which effects a swaging of flange 26 into the tapered groove of the piston rod and into secure engagement with surface 16 of the piston rod, and a swaging of tip 36 into groove 29, all while the piston head remains in rigid abutment with split ring 20, the result being as shown in FIGS. 1 and 3.

It will be understood that any suitable swaging or cold forming means may be utilized to produce the desired result, which includes a rigid, integrated relationship between the surfaces in engagement of the piston rod, the piston head and the swage ring. It will be appreciated that a simple tool such as a sledge hammer may be utilized to perform the swaging operation by forcing the swage ring 30 into the annular groove 24 of the piston head.

If it is desired to provide in any given application a shorter piston stroke than is provided by the piston head construction illustrated, it may be easily done by utilizing a swage ring 30 which is axially longer by a measured amount than the depth of the internal groove 24 so that when fully engaged the swage ring projects a predetermined distance beyond the end of the piston rod to thereby limit the stroke.

In FIGS. 1–3 we have illustrated as representative only a particular configuration of a piston head, which may, of course, vary as desired or as requirements may dictate to suit different applications. For example, in FIG. 4 there is illustrated a slightly modified assembly in which split ring 20 has been eliminated and the piston head abuts directly the stepped annular surface portion 40 of the piston rod. Such construction reduces cost, of course, and may be used whenever the piston rod is sufficiently large in diameter to provide directly an abutment shoulder 40 and a tapered rod surface 42 while retaining required rod end strength and rigidity.

FIG. 5 illustrates a modification wherein a piston rod 44 has a pair of tapered circumferential grooves 46 axially spaced one from the other in allochiral relationship and which are similar to the tapered groove formed in shaft 10 by tapered surfaces 16 and 38. A double ended piston head 50 is centrally mounted on rod 44 and may be similar in design to that shown in FIGS. 1–3, or of any other suitable configuration, except that it includes a pair of axially spaced sets of annular internal grooves 24, 24', swage flanges 26, 26', outer flanges 28, 28', and swage rings 30, 30', and so forth as in the single piston head, all such elements being in allochiral relationship to each other and engaging the tapered grooves of the rod as shown. Any suitable external swaging tool may be used to engage the swaging rings in the piston head, such as a pair of axially spaced hollow tubular members in a fixture which may be brought to bear against the opposed swage rings and simultaneously forcibly engage the swage rings in the internal grooves 24, 24'.

Although I have described and illustrated only a few embodiments of my invention, it will be understood by those skilled in the art that various changes in the structure and relative arrangement of parts may be made without departing from the scope of my invention.

We claim:

1. A piston assembly comprising a piston rod, a piston head securable to the piston rod, an elongated inwardly tapered groove formed in the piston rod having a circumferential surface forming an obtuse angle with the peripheral surface of the rod, said piston head including an inner axially projecting flange and an outer axially projecting flange forming with the inner flange a relatively deep internal annular groove, and independent swaging means longer in axial extent than said elongated groove insertable forcibly into said annular groove for bending inwardly of the piston rod said inner flange so that it becomes disposed along and in secure surface engagement with the said circumferential surface of the tapered groove, said swaging means becoming an integral part of the piston head following insertion thereof in said internal annular groove so as to overlap one end of said elongated groove.

2. A piston assembly as claimed in claim 1 wherein the end portion of the piston rod is of a smaller diameter than the main portion thereof to provide an annular wall abutting the side of the piston head opposite the side which engages said tapered groove.

3. A piston assembly as claimed in claim 1 wherein a second such tapered groove is formed in the piston rod in allochiral and axially spaced relation to the first said tapered groove, a second such piston head integral with the first-mentioned piston head extending along the piston rod in an opposite direction and in allochiral relation to the first piston head, and second such swaging means insertable forcibly into the internal annular groove of the second piston head for securing the second piston head to the piston rod in a manner similar to the securing of the first-mentioned piston head to the piston rod.

4. A piston assembly as claimed in claim 1 wherein the swaging means comprises a tapered ring-shaped element.

5. A piston assembly as claimed in claim 1 wherein the swaging means is formed to fill said internal annular groove following forcible entry thereof to swage said inner flange into engagement with said circumferential surface of said tapered groove, said swaging means becoming an integral part of the piston head following insertion thereof in said internal annular groove, and an end wall formed in the piston rod adjacent the end of the tapered groove adapted to abut the adjacent end of the inner flange when it is swaged into engagement with said tapered groove.

6. A piston assembly as claimed in claim 4 wherein said internal annular groove includes a locking groove into which is swaged a portion of the swaging ring to lock the swaging ring into the piston head.

7. A piston assembly as claimed in claim 1 wherein the outer end surface of said swaging means is substantially flush with the adjacent end surface of the piston rod when the swaging means is integral with the piston head.

* * * * *